(12) United States Patent
Brockhaus et al.

(10) Patent No.: US 7,721,100 B2
(45) Date of Patent: *May 18, 2010

(54) GRANTING AN ACCESS TO A COMPUTER-BASED OBJECT

(75) Inventors: Hendrik Brockhaus, Unterbiberg (DE); Andreas Furch, Freising (DE); Kay-Christian Wondollek, Oberschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 1084 days.

This patent is subject to a terminal disclaimer.

(21) Appl. No.: 10/574,181

(22) PCT Filed: Sep. 20, 2004

(86) PCT No.: PCT/EP2004/052243

§ 371 (c)(1),
(2), (4) Date: Mar. 30, 2006

(87) PCT Pub. No.: WO2005/031545

PCT Pub. Date: Apr. 7, 2005

(65) Prior Publication Data

US 2006/0272004 A1    Nov. 30, 2006

(30) Foreign Application Priority Data

Sep. 30, 2003  (DE) ................ 103 45 527

(51) Int. Cl.
*H04L 9/00* (2006.01)

(52) U.S. Cl. .................................... 713/172

(58) Field of Classification Search ................. 713/172, 713/176, 173, 165, 167, 180; 380/282, 285
See application file for complete search history.

(56) References Cited

U.S. PATENT DOCUMENTS

| 5,201,000 | A | | 4/1993 | Matyas et al. |
| 5,999,626 | A | * | 12/1999 | Mullin et al. ................ 713/172 |
| 6,868,404 | B1 | * | 3/2005 | Ono et al. ..................... 705/55 |
| 6,873,706 | B1 | * | 3/2005 | Miyazaki et al. .............. 380/30 |
| 2001/0021251 | A1 | * | 9/2001 | Kasai ......................... 380/201 |
| 2002/0029347 | A1 | | 3/2002 | Edelman |
| 2003/0161473 | A1 | | 8/2003 | Fransdonk |
| 2004/0132437 | A1 | * | 7/2004 | Ohmori et al. ........... 455/414.1 |
| 2005/0132186 | A1 | * | 6/2005 | Khan et al. .................. 713/165 |

FOREIGN PATENT DOCUMENTS

| EP | 0 803 789 A2 | 10/1997 |
| EP | 1 076 279 A1 | 2/2001 |
| EP | 1 191 419 A2 | 3/2002 |

OTHER PUBLICATIONS

B. Schneier, "Authentication", Applied Cryptography, Protocols, Algorithms and Source Code in C, New York, John Wiley & Sons, US, 1996, pp. 52-65, 178, XP002908685.

* cited by examiner

*Primary Examiner*—Beemnet W Dada

(57) ABSTRACT

In order to grant an access to a computer-based object, a memory card having a program code processor is provided, on which at least one public and private key assigned to the memory card are stored. In addition, an item of license information is provided, which comprises at least one license code encrypted by means of the public key assigned to the memory card, on a computing device which controls the access to the computer-based object.

11 Claims, 1 Drawing Sheet

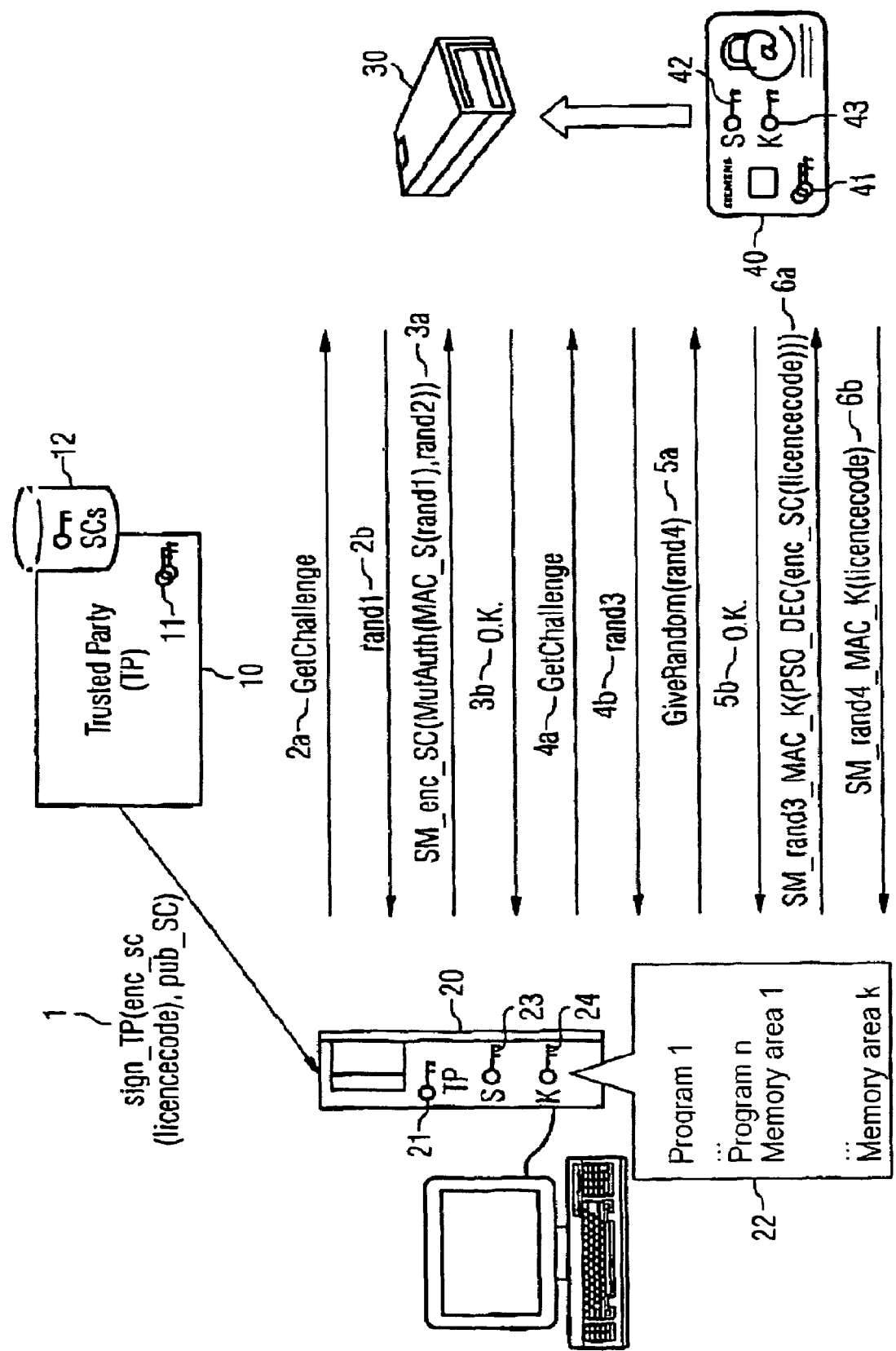

GRANTING AN ACCESS TO A COMPUTER-BASED OBJECT

CROSS REFERENCE TO RELATED APPLICATIONS

This application is the US National Stage of International Application No. PCT/EP2004/052243, filed Sep. 20, 2004 and claims the benefit thereof. The International Application claims the benefits of German application No. 10345527.2 filed Sep. 30, 2003, both of the applications are incorporated by reference herein in their entirety.

FIELD OF THE INVENTION

The present invention relates to a method for granting an access to a computer-based object and to a control program for performing the method.

BACKGROUND OF THE INVENTION

Immense damage is caused worldwide as a result of the unauthorized use of computer programs. Solutions designed to protect computer programs against unauthorized use have been developed in order to counter this problem.

Transmitting encrypted information in order to activate a computer program serves to prevent unauthorized replications of the computer program. Moreover, corresponding methods serve for example as a technical precondition for selling computer programs as products via e-commerce. With previously known methods for activating computer programs, computer programs are enabled (activated) with the aid of a unique registration key in each case. In order to activate a computer program, the registration key which is permanently assigned to a computer program license is entered manually or loaded from a data medium. In particular with a plurality of computer programs installed on different computers, this results in a high administration overhead which is associated with labor-intensive operating and maintenance tasks.

A method wherein predefinable functions of a computer program can be activated for a selectable period of use by modification of a registration key pair is known from EP 1 191 419 A2. The registration key pair has at least one part-information item that is locked against user accesses. The functions which are to be activated do not necessarily have to have been already available for an activation at the time of an initial installation of the computer program, but can also be selected and added at some later time. No deployment of operating and maintenance personnel is necessary at the location of the computer on which the particular computer program is installed in order to activate the functions.

Components of the registration key pair according to the method described in EP 1 191 419 A2 are application information and an application value. The application information is input at a first computer on which the computer program to be registered is installed or, alternatively, is generated by the first computer. The application value is calculated from the application information by means of coding in a second computer.

For a registration of a computer program or a change to the registration, first application information comprising at least one partial information element that is locked against user accesses is transmitted to the second computer. In the second computer, an application value is calculated from the first application information and subsequently transmitted to the first computer. In the first computer, second application information is determined from the application value by means of decoding. The first and the second application information are checked to determine they match at the start of an execution of the computer program. Predefinable functions of the computer program are activated as a function of the differences resulting during the check.

SUMMARY OF THE INVENTION

The object of the present invention is to specify a method which affords increased protection against unauthorized use of resources provided in a computing device, as well as an implementation suitable for automated execution of the method.

This object is achieved according to the invention by a method and a control program having the features recited in the claims. Advantageous embodiments of the present invention are set forth in the dependent claims.

According to the invention, increased protection against unauthorized use of resources provided in a computing device results from the provisioning of a memory card having a program code processor and an item of license information as a precondition for granting an access to a computer-based object. At least one public and private key assigned to the memory card are stored on the memory card. The license information includes at least one license code encrypted by means of the public key assigned to the memory card and is provided on a computing device controlling the access to the computer-based object.

According to the invention, a symmetric key is generated from a first random number generated by the memory card and from a second random number provided by the computing device, said symmetric key being made accessible to the memory card and the computing device. The encrypted license code and a specification, provided with a hash value encrypted using the symmetric key, of a function to be performed by the memory card in order to decrypt the license code are transmitted to the memory card. The encrypted hash value is decrypted by the memory card and checked for agreement with a hash value computed for the specification of the function to be performed by the memory card. If the result of the check is positive, the function for decrypting the license code is executed by the memory card and a decrypted license code is transmitted to the computing device. The decrypted license code is then provided at least temporarily for accessing the computer-based object.

Without in any way limiting the generality of the term, computing device should be understood as meaning, for example, PCs, notebooks, servers, PDAs, mobile telephones, automated teller machines, control modules used in automation technology, automotive engineering, communications technology or medical engineering—generally devices in which computer programs can execute. Furthermore, computer-based objects are, for example, without in any way limiting the generality of this term, operating systems, control or application programs, services provided by operating systems, control or application programs, service features, functions or procedures, access rights to peripheral devices, as well as data residing on a storage medium.

According to an advantageous development of the present invention, the public key of the trusted party is provided, protected against manipulation, at the computing device. In addition, the license information is digitally signed by means of a private key of the trusted party. The digital signature of the license information can therefore be checked in the computing device with the aid of the public key of the trusted party. In this way a trusted and secure transmission of the license information to the computing device can be guaranteed.

The decrypted license code can be provided with a hash value that is encrypted using the symmetric key. The encrypted hash value of the decrypted license code can then be decrypted in the computing device and checked for agreement with a hash value computed for the decrypted license code. This offers the advantage that it is ensured that the license code has actually been decrypted using the memory card provided for the decryption.

Preferably the symmetric key is valid for one access-granting transaction only and is regenerated for each new access request. This contributes toward a further increase in security against attempts at manipulation.

Advantageously the license information additionally comprises the public key assigned to the memory card. In addition, the first random number is transmitted, digitally signed by means of the private key assigned to the memory card, to the computing device. The digital signature of the first random number is then checked in the computing device with the aid of the public key assigned to the memory card. The second random number is encrypted by means of the public key of the memory card and transmitted to the memory card, where it is decrypted. This development offers the advantage of a secure transmission of the first and second random number for generating the symmetric key.

According to a further advantageous embodiment of the present invention, the encrypted license code and the specification, provided with the encrypted hash value, of the function to be executed by the memory card are transmitted via a secure communications link from the computing device via a reading device to the memory card. In this way possibilities of manipulation in order to obtain unauthorized access to the computer-based object are restricted further.

Advantageously, a third random number is generated by the memory card and transmitted to the computing device. A hash value, which is encrypted by means of the symmetric key and the third random number, can then be computed by the computing device for specification of the function to be executed by the memory card and transmitted in encrypted form to the memory card. Finally, the hash value encrypted by means of the symmetric key and the third random number is decrypted by the memory card and checked for agreement with a hash value computed for the specification of the function to be executed by the memory card. By this means an effective protection against repetition is produced, with the result that an interception of signals exchanged between the memory card and the computing device does not open up any effective possibilities for manipulation. Furthermore, this embodiment offers the advantage that available secure messaging methods can be used for transmission of a corresponding function call for the purpose of decrypting the license code.

In order to guarantee a protection against repetition with regard to a transmission of the decrypted license code to the computing device, according to a further embodiment a fourth random number is generated in the computing device and transmitted to the memory card. A hash value, which is encrypted by means of the symmetric key and the fourth random number, is then computed for the decrypted license code by the memory card and transmitted in encrypted form to the computing device. The hash value encrypted by means of the symmetric key and the fourth random number can subsequently be decrypted in the computing device and checked for agreement with a hash value computed for the decrypted license code.

According to a preferred embodiment of the present invention, the decrypted license code and a check process sequence are aligned with a respective reference specification for the purpose of granting access to the computer-based object. This offers additional security, since the presence of the decrypted license code is no longer sufficient on its own for authorizing an access, but is tied to a successful check process sequence.

BRIEF DESCRIPTION OF THE DRAWINGS

The present invention is explained in more detail below on the basis of an exemplary embodiment and with reference to the drawing.

The FIGURE shows a schematic representation of an application environment of the present invention comprising an exchange of information and messages between a trusted party, a computing device controlling the access to a computer-based object, and a memory card with program code processor.

DETAILED DESCRIPTION OF THE INVENTION

The application environment of the present invention represented in the FIGURE comprises a trusted party 10, a computer 20, and a smartcard terminal 30 which is connected to the computer 20 and into which a smartcard 40 can be introduced. The trusted party 10 may be assigned, for example, to a manufacturer of a software product that is to be protected against unauthorized access and takes responsibility for managing licenses and key material assigned to smartcards. Also assigned to the trusted party 10 is an asymmetric key pair 11 which comprises a private and a public key. For the purpose of storing the key material assigned to smartcards there is provided a database 12 which contains public keys of smartcards that are to be shipped or have already been shipped.

System resources 22, comprising for example programs or memory areas containing data, are made available to one or more users by the computer 20. The method described here for granting an access to a computer-based object is basically applicable to any system resources. The computer 20 controls in particular an access to the system resources 22, which in the present case also comprise software of the manufacturer to which the trusted party 10 is assigned. Furthermore the public key 21 of the trusted party 10 is provided, protected against manipulation, at the computer 20.

The smartcard terminal 30 is connected to the computer 20 via a secure communications link. The smartcard terminal 30 is used for exchanging information and messages between the computer 20 and a smartcard 40 which can be introduced into the smartcard terminal 30 and represents a memory card having a program code processor. Stored on the smartcard 40 is an asymmetric key pair 41 which is assigned to the smartcard 40 and which comprises a public and a private key of the smartcard 40. Also provided on the smartcard 40 is at least one program for encrypting and decrypting using the asymmetric key pair 41 of the smartcard 40. In addition, the smartcard 40 has a random number generator and is preferably compliant with ISO 7816/8.

An item of license information 1 generated by the trusted party 10 is provided at the computer 20. Said license information 1 comprises a license code (enc_SC(licencecode)), encrypted by means of the public key assigned to the smartcard 40, and the public key (pub_SC) assigned to the smartcard 40. In addition, the license information 1 is digitally signed (sig_TP) by means of the private key of the trusted party 10, so that the digital signature of the license information 1 can be checked in the computer 20 with the aid of the public key 21 of the trusted party 10.

For the purpose of generating a symmetric key (K) 24,43 which is valid for one access-granting transaction only and is to be regenerated for each new access request, the smartcard 40 is first requested to generate a first random number (rand1) by means of a request message 2a (GetChallenge) of the computer 20. Following generation of the first random number by the smartcard 40, the request message 2a is answered by transmission of a result message 2b (rand1) containing the first random number. Depending on the security requirement, the first random number can also be transmitted, digitally signed by means of the private key of the smartcard 40, to the computer 20 and verified there.

Following reception of the first random number the computer 20 generates a second random number (rand2) and transmits the latter using secure messaging by means of a Mutual-Authenticate command 3a (SM_enc_SC (MutAuth( ))) encrypted by means of the public key of the smartcard 40 to the smartcard 40. The Mutual-Authenticate command 3a comprises the second random number as well as a message authentication code (MAC_S) formed for the first random number using a further symmetric key (S) 23, 42. Said further symmetric key 23, 42 is stored both in the computer 20 and on the smartcard 40, serves for a mutual authentication between the computer 20 and the smartcard 40, and does not necessarily have to be kept secret. In addition to the first random number, the message authentication code formed for the first random number includes a hash value formed for the first random number and encrypted by means of the further symmetric key 23, 42.

In order to confirm a successful decryption of the Mutual-Authenticate command and check of the message authentication code, and hence the reception of the second random number, an acknowledgement message 3b is transmitted to the computer 20. In this way it is ensured that the first and second random numbers are present both in the computer 20 and on the smartcard 40 for the purpose of generating the symmetric key 24, 43. The symmetric key is then generated in the computer 20 and on the smartcard 40 independently of each other. The symmetric key 24, 43 is thus available both in the computer 20 and also on the smartcard 40 at least for the duration of an access-granting transaction. The generation of the symmetric key 24, 43 creates a basis for subsequently transmitting to the smartcard 40 a function call for the purpose of decrypting the license code (PSO_DEC—perform security operation mode decrypt, applied to the license code encrypted by means of the public key of the smartcard 40) using secure messaging.

Following this, the smartcard 40 is requested for generating a third random number (rand3) for the implementation of a protection against repetition by means of a request message 4a (GetChallenge) of the computer 20. After the third random number has been generated by the smartcard 40, the request message 4a is answered by transmission of a result message 4b (rand3) containing the third random number. Next, a fourth random number (rand4) is generated in the computer 20 and transmitted by means of a message 5a (GiveRandom) to the smartcard 40. The reception of the fourth random number is acknowledged by the smartcard 40 by means of an acknowledgement message 5b.

Following the acknowledged transmission of the fourth random number, a message 6a for decrypting the license code is transmitted by the computer 20 to the smartcard 40. As well as the encrypted license code, the message 6a for decrypting the license code includes a specification of a function for decryption of the license code that is to be executed by the smartcard 40. The specification of the function to be executed by the smartcard 40 is provided with a hash value which is encrypted by means of the symmetric key 24, 43 and the third random number. The hash value encrypted by means of the symmetric key 24, 43 and the third random number is subsequently decrypted by the smartcard 40 and checked for agreement with a hash value computed for the specification of the function that is to be executed by smartcard 40.

If the result of the check is positive, the function for decrypting the license code is executed by the smartcard 40 and a decrypted license code is transmitted by means of a message 6b to the computer 20 using secure messaging. For the purpose of using secure messaging the smartcard 40 computes a hash value for the decrypted license code, said hash value being encrypted by means of the symmetric key 24, 43 and the fourth random number. This encrypted hash value is transmitted to the computer 20 together with the decrypted license code. There, the hash value is subsequently decrypted by means of the symmetric key 24, 43 and the fourth random number and checked for agreement with a hash value computed for the decrypted license code.

If the hash values are in agreement, the decrypted license code is provided at least temporarily for accessing the protected software or a computer-based object. In order to rule out possible attempts at manipulation, the decrypted license code and a check process sequence should be aligned with a respective reference specification before access is granted to the protected software. If the alignment is successful, access can then be granted.

Control of the execution of the method for granting access to protected software or a computer-based object is implemented by means of a control program which can be loaded into a working memory of the computer 20 and which has at least one code section, upon execution of which the generation of a symmetric key from a first random number generated by a memory card having a program code processor and from a second random number provided by the computing device is initiated first. Next to be initiated is a transmission, to the memory card, of a license code encrypted by means of the public key assigned to the memory card and of a specification, provided with a hash value encrypted using the symmetric key, of a function that is to be executed by the memory card for decrypting the license code. Additionally initiated upon execution is a decryption of the encrypted hash value by the memory card and a check for agreement with a hash value computed for the specification of the function to be executed by the memory card. If the result of the check is positive, an execution of the function for decryption of the license code by the memory card and a transmission of an encrypted license code to the computer 20 are then initiated. Finally, upon execution of the code section, the decrypted license code is provided at least temporarily by the computer 20 for accessing the computer-based object when the control program executes in the computer 20.

The use of the present invention is not restricted to the exemplary embodiment described here.

The invention claimed is:

1. A method for granting access to a computer-based object, comprising:
providing a memory card comprising a program code processor;
assigning a public and private key to the memory card;
storing the public and private key assigned to the memory card on the memory card;

providing license information comprising a license code encrypted by the public key assigned to the memory card at a computing device that controls the access to the computer-based object;

generating a symmetric key which is available to the memory card and the computing device from a first random number generated by the memory card and from a second random number provided by the computing device;

transmitting the encrypted license code and a specification of a function to be executed by the memory card for decrypting the encrypted license code which is provided with a hash value encrypted using the symmetric key to the memory card;

decrypting the encrypted hash value by the memory card and checking for agreement with a hash value computed for the specification of the function to be executed by the memory card for decrypting the encrypted license code; and executing a function for decrypting the encrypted license code by the memory card and transmitting the decrypted license code to the computing device if a result of the check is in agreement, wherein the decrypted license code provides at least temporary access to the computer-based object.

2. The method as claimed in claim 1, wherein a public key of a trusted party is provided and protected against manipulations at the computing device, wherein the license information is digitally signed by a private key of the trusted party, and wherein the digital signature of the license information is checked in the computing device with the public key of the trusted party.

3. The method as claimed in claim 1, wherein the decrypted license code is provided with a hash value encrypted using the symmetric key, and wherein the encrypted hash value of the decrypted license code is decrypted in the computing device and checked for agreement with a hash value computed for the decrypted license code.

4. The method as claimed in claim 1, wherein the symmetric key is only valid for one access-granting transaction and is regenerated for each new access request.

5. The method as claimed in claim 1, wherein the license information additionally comprises the public key assigned to the memory card, wherein the first random number is transmitted, digitally signed by the private key assigned to the memory card, to the computing device, wherein the digital signature of the first random number is checked in the computing device with the public key assigned to the memory card, and wherein the second random number is transmitted, encrypted by the public key of the memory card, to the memory card and decrypted there.

6. The method as claimed in claim 1, wherein the encrypted license code and the specification, provided with the hash value encrypted using the symmetric key, of the function to be executed by the memory card for decrypting the encrypted license code are transmitted via a secure communications link from the computing device via a reading device to the memory card.

7. The method as claimed in claim 1, wherein a third random number is generated by the memory card and transmitted to the computing device, wherein a hash value, which is encrypted by the symmetric key and the third random number, is computed by the computing device for the specification of the function to be executed by the memory card for decrypting the encrypted license code and transmitted in encrypted form to the memory card, and wherein the hash value encrypted by the symmetric key and the third random number is decrypted by the memory card and checked for agreement with a hash value computed for the specification of the function to be executed by the memory card for decrypting the encrypted license code.

8. The method as claimed in claim 7, wherein a fourth random number is generated in the computing device and transmitted to the memory card, wherein a hash value, which is encrypted by the symmetric key and the fourth random number, is computed by the memory card for the decrypted license code and transmitted in encrypted form to the computing device, and wherein the hash value encrypted by the symmetric key and the fourth random number is decrypted in the computing device and checked for agreement with a hash value computed for the decrypted license code.

9. The method as claimed in claim 1, wherein the decrypted license code and a check process sequence are aligned with a respective reference specification for granting the access to the computer-based object.

10. The method as claimed in claim 1, wherein the computer-based object is selected from the group consisting of: operating systems, control or application programs, services provided by operating systems, functions or procedures, access rights to peripheral devices, and data residing on a storage medium.

11. A control program loaded into a working memory of a computing device and having a code section, comprising:

a code that generates a symmetric key from a first random number generated by a memory card having a program code processor and from a second random number provided by the computing device;

a code that transmits a license code and a specification to the memory card, wherein the license code is encrypted by a public key assigned to the memory card and, wherein the specification, provided with a hash value encrypted using the symmetric key, is of a function to be executed by the memory card for decrypting the encrypted license code;

a code that decrypts the encrypted hash value by the memory card and checks for agreement with a hash value computed for the specification of the function to be executed by the memory card for decrypting the encrypted license code; and a code that executes a function for decrypting the encrypted license code by the memory card and transmits the decrypted license code to the computing device if a result of the check is in agreement, wherein the decrypted license code provides at least temporary access to the computer-based object by the computing device.

* * * * *